(12) United States Patent
Sahara

(10) Patent No.: US 6,324,943 B1
(45) Date of Patent: Dec. 4, 2001

(54) INDEXING DRIVE HAVING A CAM-POSITIONING MECHANISM

(75) Inventor: Shinsuke Sahara, Takatsuki (JP)

(73) Assignee: Tsubakimoto Chain Co.

( * ) Notice: Subject to any disclaimer, the term of this patent is extended or adjusted under 35 U.S.C. 154(b) by 0 days.

(21) Appl. No.: 09/389,264

(22) Filed: Sep. 3, 1999

(30) Foreign Application Priority Data

Sep. 4, 1998 (JP) .................................. 10-2509752

(51) Int. Cl.$^7$ .............................. F16H 27/04; F16H 57/02
(52) U.S. Cl. .......................................... 74/813 R; 74/84 R
(58) Field of Search .............................. 74/84 R, 813 R, 74/816, 817, 821, 813 C, 813 L

(56) References Cited

U.S. PATENT DOCUMENTS

| 5,097,718 | * | 3/1992 | Sahara | ................................... 74/84 R |
| 5,806,367 | * | 9/1998 | Kato | ..................................... 74/84 R |

FOREIGN PATENT DOCUMENTS

| 30965 | * | 2/1989 | (JP) | ...................................... 74/84 R |
| 6207653 | * | 7/1994 | (JP) | ...................................... 74/84 R |

* cited by examiner

*Primary Examiner*—Mary Ann Green
(74) *Attorney, Agent, or Firm*—Dann, Dorfman, Herrell and Skillman, P.C.; Henry H. Skillman

(57) ABSTRACT

Two cam-bearing holders of an indexing drive are bolted to opposed side walls of a housing in such a way that respective positions of the cam-bearing holders are adjustable in a plane orthogonal to an axial direction of the cam shaft along the side walls. Each of the cam-bearing holders has a first reference surface for positioning the cam-bearing holder relative to a positioning reference surface of the output shaft in the axial direction of an output shaft and a second reference surface for positioning the cam-bearing holder in a direction orthogonal to the axial direction of the output shaft. With such novel arrangements, there is achieved an improved cam-positioning mechanism for the indexing drive which can accurately adjust a meshing engagement between the cam and roller followers of the output shaft and thereby allows the indexing drive to be assembled with greatly increased accuracy.

5 Claims, 13 Drawing Sheets

INDEXING DRIVE HAVING A CAM-POSITIONING MECHANISM

BACKGROUND OF THE INVENTION

1. Field of the Invention

The present invention relates to an indexing drive having a mechanism for positioning a cam relative to roller followers mounted on a follower wheel.

2. Description of the Related Art

The indexing drives are a power transmitting device whose input shaft is driven to rotate at a given speed to thereby cause its output shaft to make intermittent rotational movements such that the output shaft stops rotating every predetermined rotational angle. One popular type of conventionally-known indexing drive is shown in FIGS. 11 and 12, where a continuous rotational movement of the input shaft is converted via a cam mechanism into intermittent rotational movements of the output shaft.

Specifically, FIGS. 11 and 12 are side sectional and front sectional views, respectively, of the conventionally-known indexing drive A1, which show the interior construction of the indexing drive A1. Within a housing A2 having a hollow box-like shape, there are contained a cam A4 fixedly mounted on a cam shaft A3 functioning as the input shaft, and a follower wheel A6 fixedly mounted on the output shaft A5. A plurality of roller followers A7 engageable with the cam A4 are provided on the follower wheel A6 at equal intervals along the outer peripheral surface of the wheel A6.

As shown in FIG. 11, holes H1 and H2 are formed in a pair of opposed side walls (i.e., front and rear walls) of the housing A2, and output-shaft-bearing holders A8 and A9 are fitted in these holes H1 and H2, respectively. The bearing holders A8 and A9 have flanges F1 and F2, respectively, which project outward of the bearing holder fitting holes H1 and H2. The output-shaft-bearing holders A8 and A9 are secured at their respective flanges F1 and F2 to the walls of the housing A2 via bolts A10.

The output shaft A5 is rotatably supported in the housing A2 via bearings A11 and A12 held in the bearing holders A8 and A9. Further, two shims S are sandwiched between the housing A2 and the flanges F1 and F2 of the bearing holders A8 and A9, in order to adjust the axial position of the output shaft A5 relative to the housing A2 and set preloads on the bearings A11 and A12.

As shown in FIG. 12, other bearing holder fitting holes H of a circular shape are formed in a pair of opposed side walls (left and right side walls) of the housing A2 extending at right angles to the front and rear walls having the above-mentioned bearing holder fitting holes H1 and H2. Eccentric bearing holders A14, each having a flange F3, are fitted in these bearing holder fitting holes H and secured to the housing A2 by means of bolts A15. Bearings A16 are held in the respective eccentric bearing holders A14, and the cam shaft A3 is rotatably supported in the housing A2 via the bearings A16 and eccentric bearing holders A14.

As shown in FIGS. 13 and 14, each of the eccentric bearing holders A14 has a surface C2 for fitting engagement with the bearing holder fitting hole H, and this fitting surface C2 and an outer peripheral surface C1 of the flange F3 lie concentrically about a central axis O of the holder A14. The flange F3 has four arcuately-curved elongate recesses h formed at equal intervals along the outer periphery thereof, and each of the bolts A15 extends through one of the recesses h.

Further, each of the eccentric bearing holders A14 has a through-hole h1 through which the cam shaft A3 of FIG. 12 extends and a bearing retaining hole h2 in which the bearing A16 is fitted, and these holes h1 and h2 are formed concentrically about and axis O' displaced from the above-mentioned central axis O by a predetermined distance e. Sealing member G is inserted in the through-hole h1 to seal between the bearing holder A14 and the cam shaft A3. In generally the same manner as for the output shaft A5, a shim S' is sandwiched between the housing A2 and the flange F3 of each of the eccentric bearing holders A14, in order to adjust the axial position of the cam shaft A3 relative to the housing A2 and set a preload on the bearing A16.

In the conventional indexing drive A1 arranged as set forth above, as the cam A4 is rotated via the cam shaft A3 at a given constant speed, each rotation of the cam A4 causes the roller followers A7, engaging with the cam A4, to be pushed by the cam A4, so that the follower wheel A6 is allowed to rotate intermittently, a predetermined angle at a time, and such intermittent rotations of the follower wheel A6 are transmitted to the output shaft A5.

The conventional indexing drive A1 constructed in the above-described manner is normally assembled in the following sequence of steps a)–f):

a) The output shaft A5 is inserted in place within the housing A2 to set preloads on the bearings A11 and A12 via the shims S.

b) The output shaft A5 is temporarily removed from within the housing A2, and then the cam shaft A3 is inserted in place within the housing A2 to set preloads on the bearings A16 via the shims S'.

c) The output shaft A5 is installed in the housing A2, and axial positioning of the center of the cam A4 relative to the center of the output shaft A5 is effected using the shims S'. More specifically, in this step, some special coating is applied to the cam A4, and the eccentric bearing holders A14, located on opposite sides of the cam A4, are turned in the same phase to thereby adjust the direction of displacement of the axis O' from the central axis O so that the cam A4 is brought into contact with the roller followers A7. Then, accuracy of the axial positioning of the cam A4 is determined by ascertaining, via the eyes of the human operator, a degree or condition of adherence of the coating material from the cam A4 onto the roller followers A7.

d) The output shaft A5 is axially positioned using the shims S' in such a way that the moving trajectory of the roller followers A7 and the axial center of the cam A4 substantially coincide with each other. In this step, the special coating is applied to the cam A4 so that accuracy of the axial positioning of the cam A4 is determined by ascertaining, via the eyes of the human operator, a degree or condition of the abutting engagement between the cam A4 and the roller followers A7 on the basis of adherence of the coating material from the cam A4 onto the roller followers A7, similarly to step c) above.

e) The eccentric bearing holders A14, located on the opposite sides of the cam A14, are further rotated in the same phase to thereby produce preloads between the cam A4 and the roller followers A7. After that, the special coating is again applied to the cam A4 so that accuracy of the axial positioning of the cam A4 is determined by ascertaining, via the eyes of the human operator, a degree or condition of the abutting engagement between the cam A4 and the roller followers A7 on the basis of adherence of the coating material from the cam A4 onto the roller followers A7.

f) It is ascertained whether the moving trajectory of the roller followers 7 and the axial center of the cam A4 coincide with each other. If the moving trajectory of the roller followers 7 and the axial center of the cam A4 are determined as not substantially coinciding with each other, steps e) and f) are repeated.

However, according to the above-mentioned assembling and position-adjusting operations for the indexing drive, where the once-inserted output shaft has to be temporarily removed from within the housing and then built into the housing again and the relative positioning between the roller followers and the cam has to be performed, on a trial-and-error basis, by checking for uneven abutting engagement between the roller followers and the cam on the basis of adherence of the coating material, there would arise a need to repeat the positioning operations when the abutting engagement between the roller followers and the cam are found uneven, which would lower the operational efficiency. Further, because the positioning operations are performed by ascertaining a condition of the abutting engagement on the basis of the coating material adherence, the human operator has to have a sufficient skill, so that uniform assemblage accuracy is difficult to achieve.

Further, the operation of causing the cam to abut against the roller followers can not be performed appropriately while checking preloads to be applied between the cam and the roller followers, e.g., from presence/absence of play between them, because the eccentric bearing holders provided on the opposite sides of the cam has to be rotated in the same phase. Thus, as the eccentric bearing holders are turned in order to apply the preloads after the axial positioning of the output, the axial center of the cam is moved eccentrically to change the positional relationship between the output shaft and the cam and the axis of the cam tends to be inclined due to a phasic difference between the rotating positions of the left and right eccentric bearing holders, which would lower the assembling accuracy.

SUMMARY OF THE INVENTION

It is accordingly an object of the present invention to provide an indexing drive having an improved cam-positioning mechanism which can accurately adjust a meshing engagement between the cam and the roller followers and thereby allows the indexing drive to be assembled with increased accuracy.

According to a first aspect of the present invention, there is provided an indexing drive which comprises: a housing; an output shaft rotatably supported in the housing via output-shaft bearings that are held in two bearing holders secured to opposed first and second side walls, respectively, of the housing, the output shaft including a follower wheel mounted thereon between the output-shaft bearings, the follower wheel having a plurality of rotatable roller followers disposed on and along an outer periphery thereof; a cam shaft rotatably supported in the housing via cam bearings that are held in two cam-bearing holders secured to opposed third and fourth side walls, respectively, of the housing extending substantially at right angles to the first and second side walls in such a way that the cam shaft is disposed substantially at right angles to the output shaft; and a cam mounted on the cam shaft between the cam-bearing holders and engageable with respective ones of the roller followers of the follower wheel. Most importantly, the two cam-bearing holders in this indexing drive are bolted to the third and fourth side walls of the housing in such a way that respective positions of the cam-bearing holders are adjustable in a plane orthogonal to an axial direction of the cam shaft along the third and fourth side walls. Each of the cam-bearing holders has a first reference surface for positioning the cam-bearing holder relative to a positioning reference surface of the output shaft in an axial direction of the output shaft and a second reference surface for positioning the cam-bearing holder in a direction orthogonal to the axial direction of the output shaft. With such novel arrangements, the present invention achieves an improved cam-positioning mechanism for the indexing drive which can accurately adjust a meshing engagement between the cam and the roller followers and thereby allows the indexing drive to be assembled with greatly increased accuracy.

According to a second aspect of the present invention, there is provided an indexing drive which comprises: a housing; an output shaft rotatably supported in the housing via output-shaft bearings that are held in two bearing holders secured to opposed first and second side walls, respectively, of the housing, the output shaft including a follower wheel mounted thereon between the output-shaft bearings, the follower wheel having a plurality of rotatable roller followers disposed on and along an outer periphery thereof; a cam shaft rotatably supported in the housing via cam bearings that are held in two cam-bearing holders secured to the first and second side walls, respectively, of the housing, the cam shaft being disposed substantially in parallel with the output shaft; and a cam mounted on the cam shaft between the cam-bearing holders and engageable with respective ones of the roller followers of the follower wheel. Most importantly, the two cam-bearing holders in this indexing drive are bolted to the first and second side walls of the housing in such a way that the position of the cam shaft relative to the output shaft is adjustable in a direction toward and away from the output shaft. Further, each of the cam-bearing holders has a reference surface for positioning the cam-bearing holder relative to the housing. With such novel arrangements too, an improved cam-positioning mechanism for the indexing drive is achieved which can accurately adjust a meshing engagement between the cam and the roller followers and thereby allows the indexing drive to be assembled with high accuracy.

The indexing drive in accordance with the first aspect of the present invention is assembled in the following step sequence.

1) The cam is inserted in place within the housing, and preloads on the cam bearings are set.
2) The cam is temporarily removed from within the housing, and then the output shaft is inserted in place within the housing to set preloads on the output-shaft bearings.
3) The cam is again inserted in place within the housing, and the first reference surface of each of the cam-bearing holders is positioned at a predetermined distance from the positioning reference surface of the output shaft, using a gauge, positioning jig etc.
4) Axial positioning of the cam relative to the housing is performed so that the cam is placed in an appropriate engagement with the roller followers on the output shaft.
5) The respective second reference surfaces of the two cam-bearing holders are pushed, via an adjustment jig or the like, to cause the cam to move toward the output shaft in parallel relation to the output shaft. The preload between the roller followers and the cam is set while ascertaining a condition of abutting engagement between them.

Further, the indexing drive in accordance with the second aspect of the present invention is assembled in the following step sequence.

1) The cam is inserted in place within the housing, and preloads on the cam bearings are set.
2) The cam is temporarily removed from within the housing, and then the output shaft is inserted in place within the housing to set preloads on the output-shaft bearings.
3) The cam is again inserted in place within the housing, and the respective reference surfaces of the two cam-bearing holders are pushed, via an adjustment jig or the like, to cause the cam to move toward the output shaft in parallel relation to the output shaft. The preload between the roller followers and the cam is set while ascertaining a condition of abutting engagement between them.

The above and other objects, features and advantages of the present invention will become apparent to those versed in the art upon making reference to the following detailed description and the accompanying sheets of drawings in which a preferred structural embodiment incorporating the principle of the present invention is shown by way of illustrative example.

DETAILED DESCRIPTION OF THE PREFERRED EMBODIMENTS

The following description is merely exemplary in nature and is in no way intended to limit the invention or its application or uses.

Figure 1:
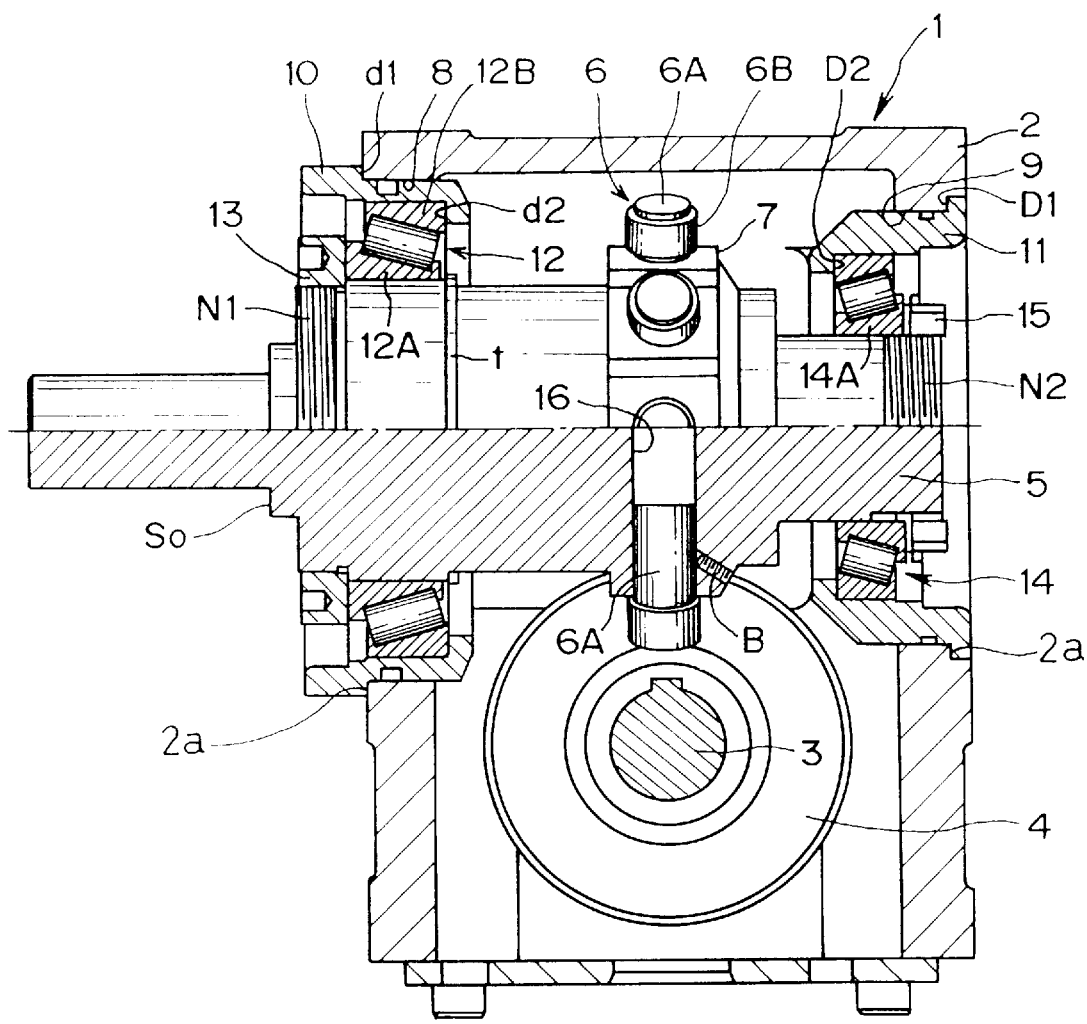
FIG. 1 is a side sectional view of an indexing drive in accordance with a first preferred embodiment of the present invention, which shows an exemplary interior construction of the indexing drive.
Figure 2:
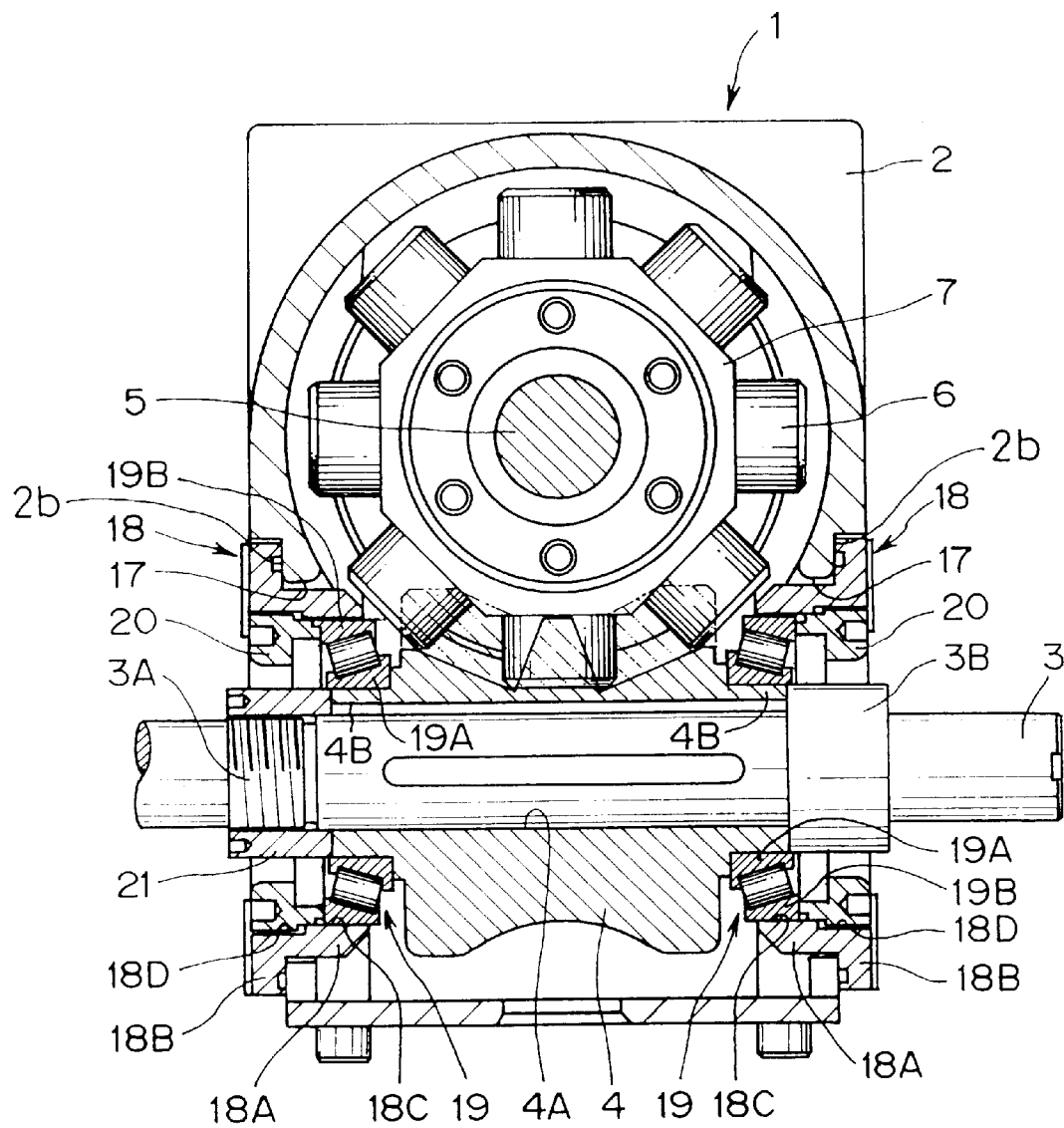
FIG. 2 is a front sectional view of the indexing drive of FIG. 1.

Initial reference is made to FIGS. 1 and 2 which are side sectional and front sectional views, respectively, of an indexing drive 1 in accordance with a preferred embodiment of the present invention, which show an exemplary interior construction of the indexing drive 1. The indexing drive 1 includes a housing 2 having a box-like shape, in which there are contained a cam 4 fixedly mounted on an input or cam shaft 3 and a follower wheel 7 formed integrally with an output shaft 5. The follower wheel 7 includes a plurality of roller followers 6 formed thereon at equal intervals along its outer periphery and extending radially outwardly from the outer periphery.

As the cam shaft 3 is rotated at a given constant speed, the cam 4, rotating with the cam shaft, 3 sequentially engages with the roller followers 6 to thereby cause the follower wheel 7 and hence the output shaft 5 to rotate intermittently, a predetermined angle at a time.

As best shown in FIG. 1, two circular holes 8 and 9 are formed in front and rear walls 2a of the housing 2, and front and rear output-shaft-bearing holders 10 and 11 are fitted in the front and rear holes 8 and 9, respectively.

The output-shaft-bearing holder 10 has, in its outer periphery, a stepped portion d1 engaging with an inner peripheral edge of the housing 2 that defines the bearing holder fitting hole 8 opening forward of the housing 2, and this stepped portion d1 allows the bearing holder 10 to be readily positioned relative to the housing 2 with high accuracy.

Also, in the front output-shaft-bearing holder 10, an output-shaft bearing 12 is held for rotatably supporting a front portion of the output shaft 5. Inner ring 12A of the output-shaft bearing 12 is confined between a flange f of the output shaft 5 and a fixing ring 13 screwed on a threaded portion N1 of the output shaft 5, so as to restrict axial movements of the output-shaft bearing 12 relative the output shaft 5. Further, the bearing holder 10 has an engagement portion d2 engaging with an outer ring 12B of the bearing 12, so that the axial positioning of the bearing 12 relative to the bearing holder 10 is achieved with high accuracy.

On the other hand, the rear output-shaft-bearing holder 11 has, in its outer periphery, a stepped portion D1 engaging with an inner peripheral edge of the housing 2 that defines the bearing holder fitting hole 9 opening rearward of the housing 2, and this stepped portion D1 allows the bearing holder 11 to be readily positioned relative to the housing 2 with high accuracy, in a similar manner to the front output-shaft-bearing holder 10.

Also, in the rear output-shaft-bearing holder 11, an output-shaft bearing 14 is held for rotatably supporting a rear portion of the output shaft 5. Inner ring 14A of the bearing 14 is normally urged forward along the axis of the output shaft 5 by means of a preload adjustment ring 15 screwed on a threaded portion N2 formed at a rear end of the output shaft 5. Further, the rear bearing holder 11 has an engagement portion D2 engaging with an outer ring 14B of the bearing 14 so that the axial positioning of the bearing 14 relative to the bearing holder 11 is achieved with high accuracy.

The follower wheel 7, formed integrally with the output shaft 5, is in the shape of a right octagonal column (see FIG. 2) and has a follower shaft fitting hole 16 in each of the eight side surfaces. In each of the holes 16, a shaft portion 6A of the roller follower 6 is fixed in place by means of a set screw D extending obliquely relative to the axis of the shaft portion 6A. Further, each of the roller followers 6 includes a roller provided for free rotation around the shaft portion 6A.

As shown in FIG. 2, side bearing fitting holes 17 of the same circular shape are formed in opposed left and right side walls 2b of the housing 2, in each of which is inserted a cylindrical portion 18A of a cam-bearing holder 18. The outer diameter of the cylindrical portion 18A of the cam-bearing holder 18 is slightly smaller than the inner diameter of the side bearing fitting hole 17, so that the position of the cam-bearing holder 18 is adjustable relative to the housing 2 in both a vertical direction and a horizontal (leftward/rightward) direction, i.e., in directions across and along the axis of the cam shaft 3.

Further, each of the cam-bearing holders 18 includes a rectangular positioning flange 18B secured to the housing 2, in addition to the above-mentioned cylindrical portion 18A. In the inner surface of the cylindrical portion 18A, a bearing holding hole 18C is formed concentrically with the cylindrical portion 18A, in which a cam bearing 19 for rotatably supporting the cam 4 is fitted and held in place; however, the bearing 19 thus held in the bearing holding hole 18C is movable over a slight distance in the axial direction of the hole 18C. Also, each of the cam-bearing holders 18 has a threaded hole 18D axially communicating with the bearing holding hole 18C and opening outward of the positioning flange 18B, and a preload adjustment ring 20 is screwed in the threaded hole 18D.

The cam 4 has an axial hole 4A formed through its central region, and the cam shaft 3 is fitted in and extends through the axial hole 4A. Specifically, the cam 4 is clamped between a fastening collar 21 screwed on a threaded portion 3A of the cam shaft 3 and an increased-diameter portion 3B of the cam shaft 3 and secured via a key (not designated) to the cam shaft 3 against rotation relative to the cam shaft 3.

Left and right cam bearings 19 have their inner rings 19A fitted in reduced-diameter portions 4A of the cam 4 that are formed in axial opposite ends of the cam 4. The left and right cam bearings 19 also have their outer rings 19B subjected to preloads by the preload adjustment rings 20 that are pressed against the respective outer surfaces of the outer rings 19B.

Figure 3:
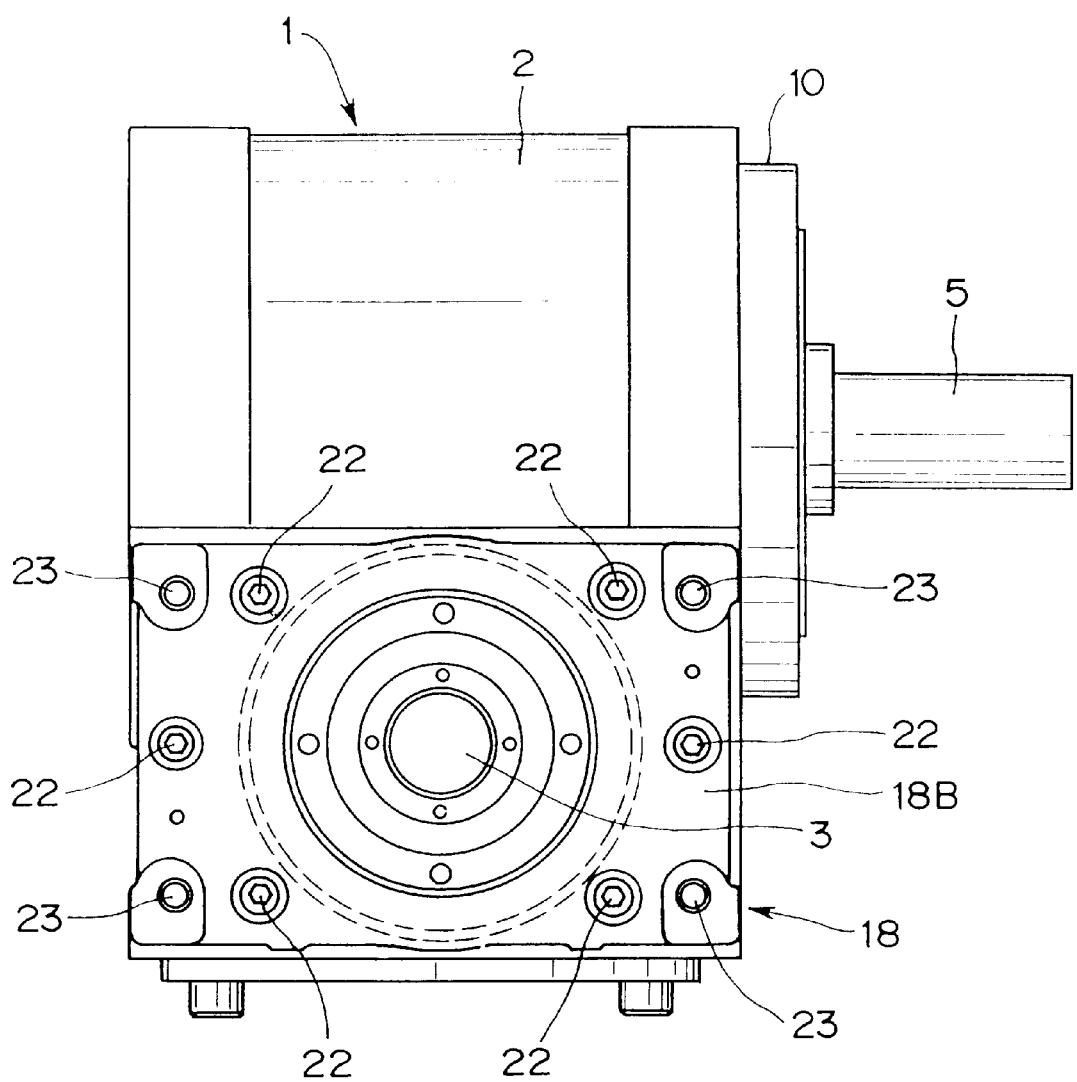
FIG. 3 is a side elevational view of the indexing drive of FIG. 1.

As shown in FIG. 3, which is a side elevational view of the indexing drive, the positioning flange 18B of each of the above-mentioned cam-bearing holders 18 is formed into a rectangular shape having a width that is substantially equal to a length of the housing 2 in its front-to-rear direction. The positioning flanges 18B of the two cam-bearing holders 18 are secured to respective lower portions of the opposite side wall surfaces 2b (FIG. 2) of the housing 2 by means of fastening bolts 22, six bolts 22 per flange 18B. Further, bolts 23 for attaching an option (optional equipment), such as a reduction gear to be coupled to the cam shaft 3, are provided at four corners of the positioning flange 18B of each of the cam-bearing holders 18.

Figure 4:
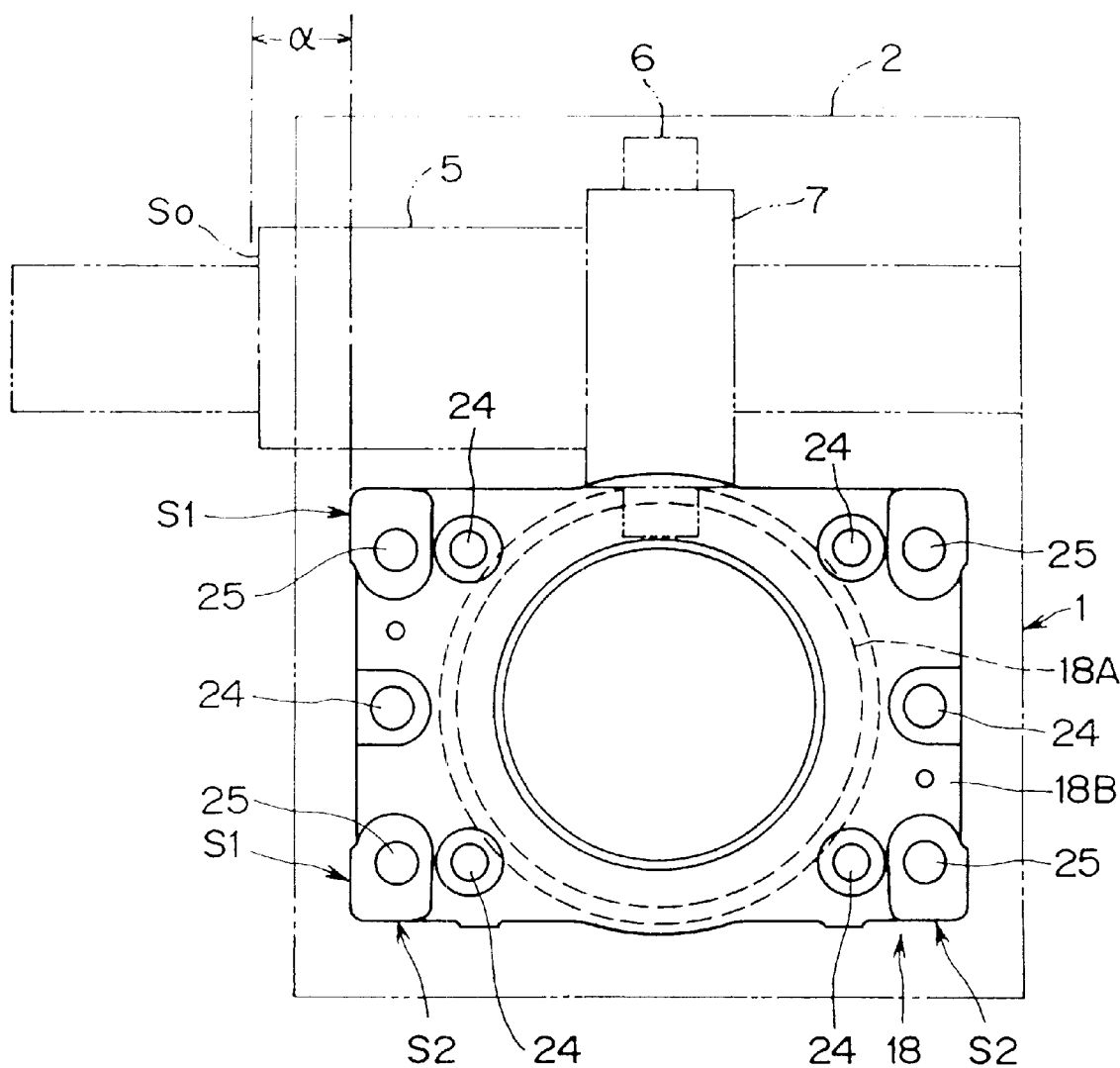
FIG. 4 is a view illustrating details of a positioning flange formed on each of cam-bearing holders of the indexing drive.

FIG. 4 shows details of the positioning flange 18B of each of the cam bearing holders 18. In the positioning flange 18B, there are formed bolt holes 24 for insertion therethrough of the above-mentioned six fastening bolts 22 and bolt holes 25 for insertion therethrough of the above-mentioned option-attaching bolts 23. Although not specifically shown, the housing 2 has, in the lower portion of each of the opposite side wall surfaces 2b and at positions corresponding substantially to respective centers of the above-mentioned bolt holes 24 and 25, threaded holes in which the fastening bolts 22 and option-attaching bolts 23 are screwed.

Further, each of the bolt holes 24 and 25 has an inner diameter slightly greater than an outer diameter of the corresponding fastening bolt 22 or option-attaching bolt 23, so that each of the cam-bearing holders 18 can be adjusted in position relative to the housing 2 in both a vertical direction and a horizontal (forward/rearward) direction during assemblage of the indexing drive 1.

As also shown in FIG. 4, the positioning flange 18B of each of the cam-bearing holders 18 has a first reference surface S1 for positioning the flange 18B relative to the housing 2 in the horizontal or forward/rearward direction and a second reference surface S2 for positioning the flange 18B relative to the housing 2 in the vertical direction. The first reference surfaces S1 are each formed by a peripheral surface portion of the rectangular positioning flange 18 that lies in a plane perpendicular to the axis of the output shaft 5 and extends in one side of the rectangular positioning flange 18B of the cam-bearing holder 18. The second reference surfaces S2 are each formed by a peripheral surface portion of the rectangular positioning flange 18 that lies in a plane parallel to the axis of the output shaft 5 and extends in an adjacent side of the rectangular positioning flange 18B of the cam-bearing holder 18.

The following paragraphs describe a step sequence for assembling the above-described indexing drive 1.

1) First, the cam bearings 19 are placed into the two cam-bearing holders 18, each provided with the preload adjustment ring 20, so that the cam 4 is supported in the housing 2 via the bearings 19 and secured to the housing 2 by screwing the fastening bolts 22 through the bolt holes 24 of the respective positioning flanges 18B of the cam-bearing holders 18. In this condition, the preloads to be imparted to the bearings 19 are set by adjusting the positions of the preload adjustment rings 20.

Note that the option-attaching bolts 23 may be attached after completion of the assemblage of the indexing drive 1. The cam shaft 3 need not be inserted into the housing 2 at this stage, because, according to the preferred embodiment of the present invention, it can be threaded through the cam 4 after completion of the indexing drive assemblage. In an alternative, the preload adjustment may be made by placing shims between the positioning flanges 18 and the housing 2, rather than by incorporating the preload adjustment rings 20 in the bearing holders 18 as above.

2) Next, the cam 4 is temporarily removed from within the housing 2, and the bearing 12 is mounted on the output shaft 5 with the roller followers already fixed to the follower wheel 7. Then, the output-shaft bearing 12 is incorporated into the bearing holder 10, and the output shaft 5, bearing 12 and bearing holder 10 coupled together via the fixing ring 13 are inserted, as a unit, into the bearing holder fitting hole 8.

After that, the output-shaft-bearing holder 11 with the bearing 14 incorporated therein is inserted into the bearing holder fitting hole 9 so that the output shaft 5 is supported via the two bearings 12 and 14. In this condition, the preload adjustment ring 15 is screwed onto the threaded portion of the output shaft 5 to thereby set preloads on the bearings 12 and 14. At this stage, the axial position of the output shaft 5 relative to the housing 2 can be fixed by placing the stepped portion d1 of the bearing holder 10 into abutting engagement with the inner peripheral edge of the housing 2 defining the bearing holder fitting hole 8 opening forward of the housing 2 and also causing the inner end surface of the outer ring 12B of the bearing 12 to abut against the stepped portion d2 formed at the inner end of the bearing holder 10.

3) Then, the cam 4 is again inserted into place within the housing 2, and the cam-bearing holders 18 on the opposite sides of the cam 4 are positioned relative to the housing 2 in the axial direction of the output shaft 5. More specifically, in this step, the cam-bearing holders 18 are positioned relative to the housing 2, through positional adjustment via a gauge, shims etc., such that the first reference surface S1 of each of the holders 18 is axially spaced, by a predetermined distance α, from a positioning reference surface S0 (FIG. 4) formed on a portion of the output shaft 4 projecting forward of the housing 2, and then the two cam-bearing holders 18 are provisionally fixed to the housing 2 by means of the fastening bolts 22. The positioning reference surface S0 lies in a plane perpendicular to the axis of the output shaft 5. Thus, the positioning reference surface S0 and the first reference surface S1 are in parallel with each other.

Figure 5:
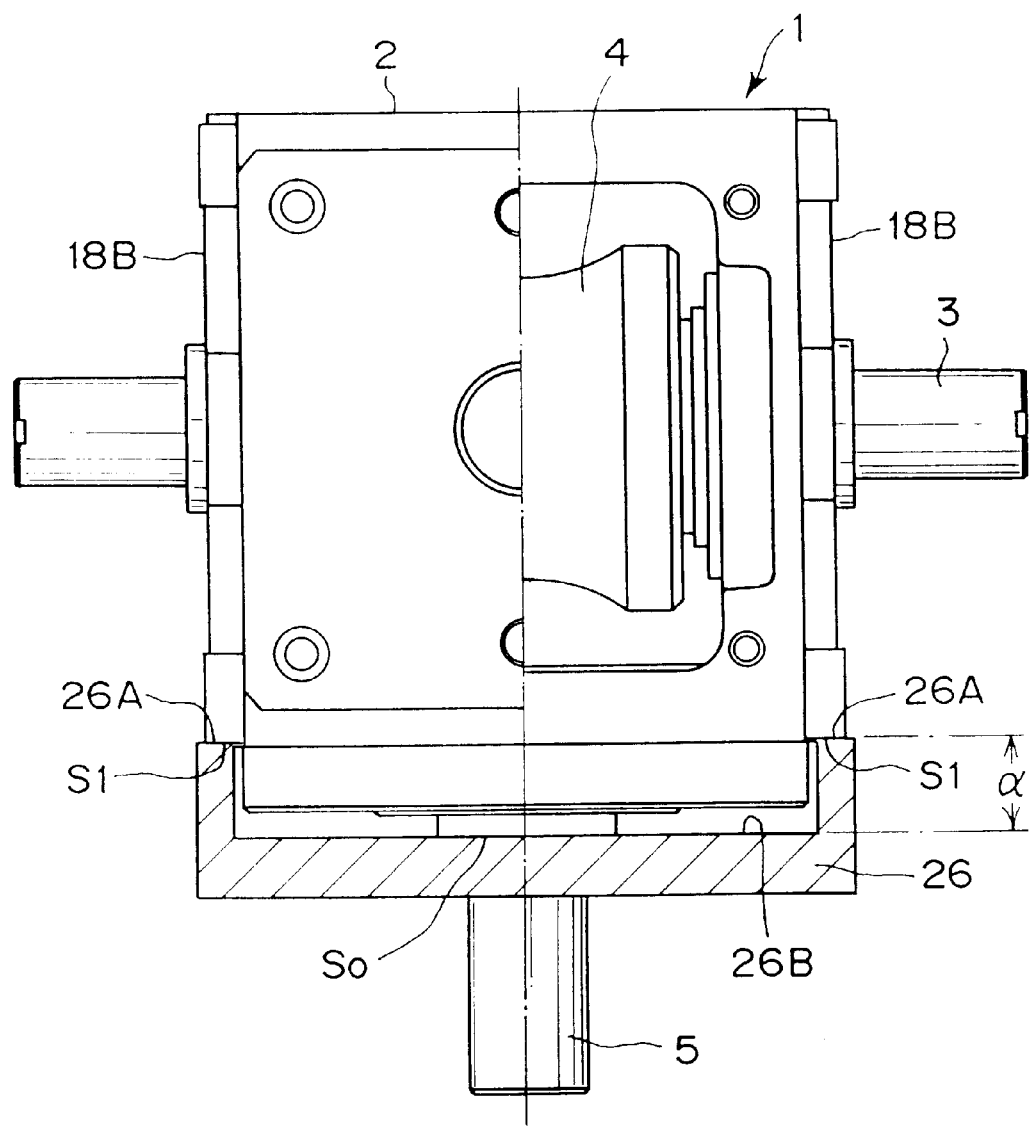
FIG. 5 is a view explanatory of a manner in which the cam shaft is adjusted in its horizontal (front-to-rear) position.

Further, in this step, the positioning of the cam-bearing holders 18 may be performed using a positioning jig 26 as illustrated in FIG. 5. This positioning jig 26 has a pair of first gauging surfaces 26A for abutting against the first reference surfaces S1 formed on the positioning flanges 18B of the cam-bearing holders 18 adjacent to the opposed side walls of the housing 2 and a second gauging surface 26B for abutting against the positioning reference surface S0 of the output shaft 5, and the first gauging surfaces 26A and the second gauging surface 26B are spaced from each other by a distance equal to the above-mentioned distance α.

4) Next, the axial position of the cam 4 is adjusted in such a way that the axial central position of the cam 4 is precisely opposed to that of the output shaft 5. According to the preferred embodiment, the positional adjustment of the cam 4 is performed by turning the preload adjustment rings 20, provided on the opposite sides of the cam 4, by the same angle in such a manner that the already-set preload on the bearing 19 is not varied.

Note that in the case where shims are used in place of the preload adjustment rings 20, the positional adjustment of the cam 4 is performed by shifting the shims, sandwiched between the positioning flanges 18B and the housing 2, in such a direction to displace the cam 4.

5) After step 4), the fastening bolts 22, fixing the two cam-bearing holders 18 to the housing 2, are loosened so as to move the cam 4 relative to the output shaft 5, so that the preloads are set to achieve an appropriate engagement between the cam 4 and the roller followers 6 while checking for any undesired play between them.

In this step, the cam 4 is positioned in such a way that the second reference surfaces S2 of the positioning flanges 18B lie at the same level on the opposite sides of the housing 2, and then the two bearing holders 18 are completely secured to the housing 2 by means of the fastening bolts 22. This way, the assemblage of the indexing drive 1 is completed.

Figure 6:
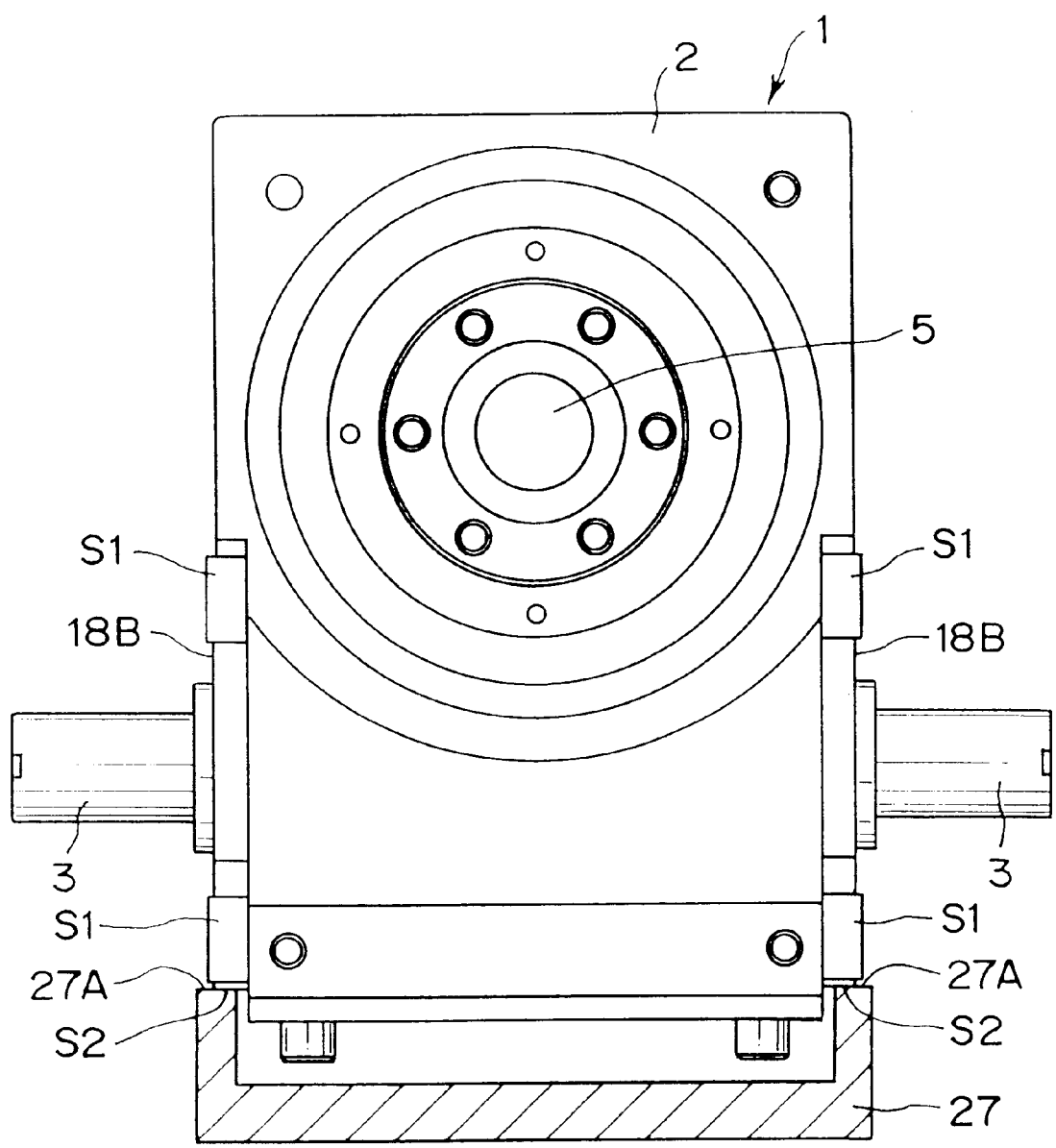
FIG. 6 is a view explanatory of a manner in which a distance between the cam shaft and output shaft is adjusted using a positioning jig.

In order to allow the second reference surfaces S2 of the flanges 18B to accurately lie at the same level on the opposite sides of the housing 2, a positioning jig 27 as shown in FIG. 6 may be used; specifically, such positioning by the jig 27 is readily achieved by uniformly pressing a pair of gauging surfaces 27A of the jig 27 against the respective second reference surfaces S2 of the two bearing holders 18.

After the output shaft 5 and cam 4 have been installed in the housing 2, the cam shaft 3 is threaded through the axial hole 4A of the cam 4, and the cam 4 is fixed to the cam shaft 3 via the fastening collar 21 and via the key against rotation relative to the shaft 3.

It should be apparent that the assemblage of the indexing drive 1 may be initiated with the cam 4 previously fixed to the cam shaft 3 or the cam 4 may be formed integrally on the cam shaft 3.

Whereas the output shaft 5 and the cam shaft 3 have been described and shown as extending at right angles to each other in relation to the preferred embodiment, the basic principle of the present invention may be applied to an indexing drive where the output shaft and the cam shaft are disposed in parallel to each other; in such a case, the two bearing holders associated with the cam shaft may be bolted in such a way that the cam shaft is adjustable in position toward or away from the output shaft, in parallel relation to each other, along the side wall surfaces of the housing.

Figure 7:
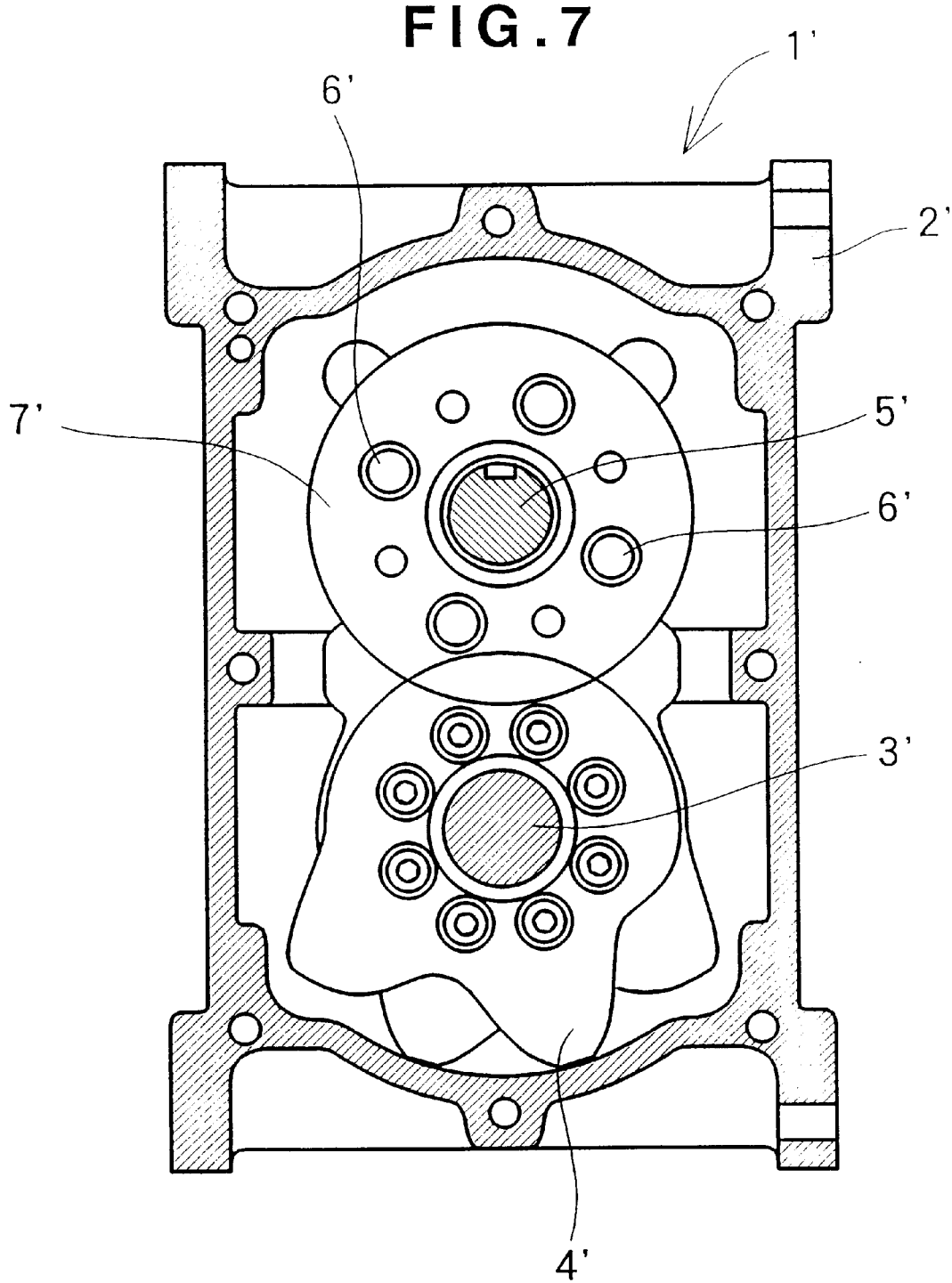
FIG. 7 is a side sectional view of an indexing drive in accordance with a second preferred embodiment of the present invention, which shows an exemplary interior construction of the indexing drive.
Figure 8:
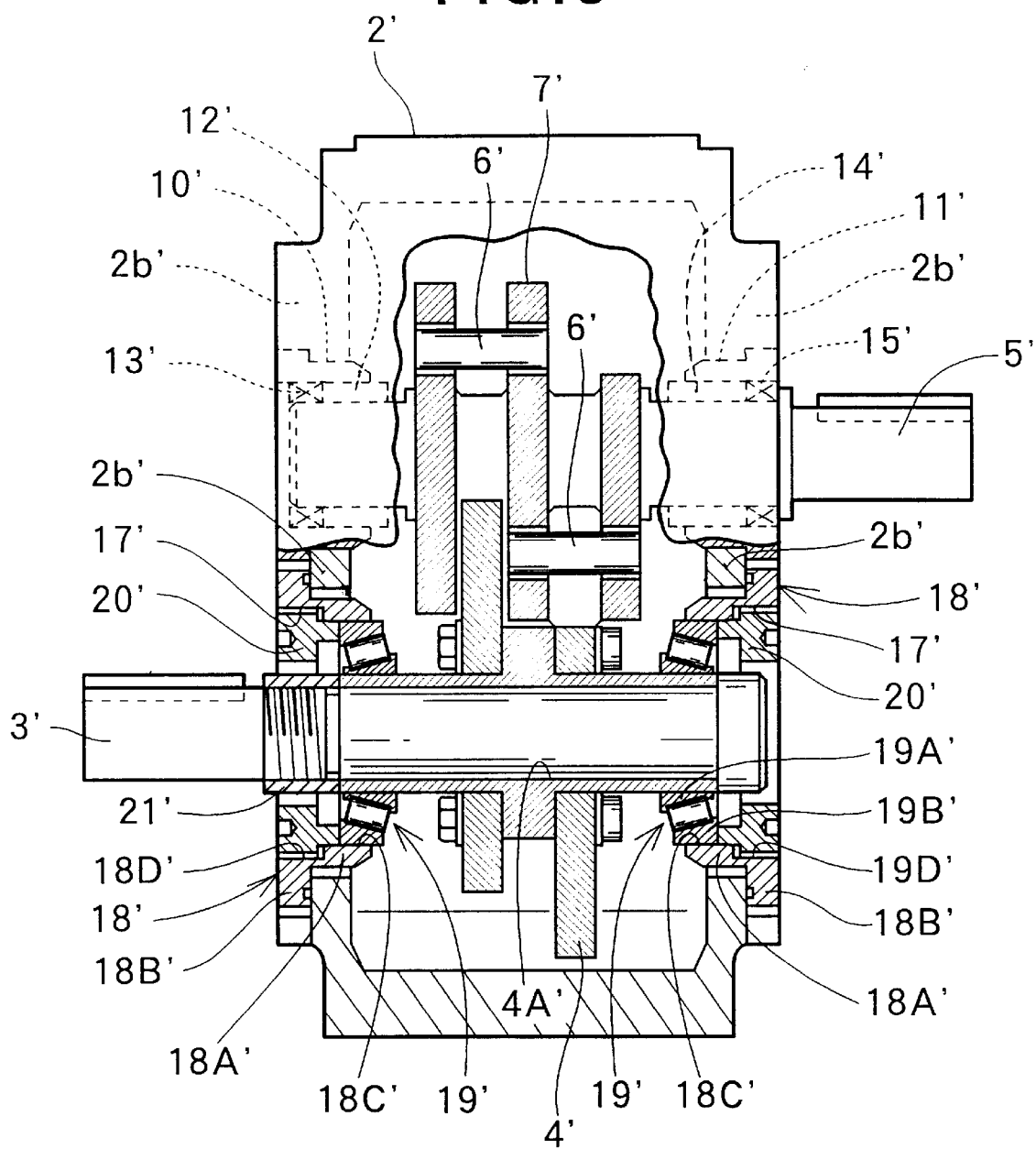
FIG. 8 is a front view, partly in cross section and partly cutaway, of the indexing drive of FIG. 7.

FIGS. 7 and 8 show an indexing drive 1' according to a second embodiment of the present invention. The indexing drive is the so-called "parallel indexing drive" having a cam shaft 3' and an output shaft 5' installed in parallel with each other. These parts which are like or corresponding to those of the first embodiment shown in FIGS. 1 and 2 are designated by the same reference characters with a symbol (') added thereto.

The output shaft 5' of the indexing drive 1' is rotatably supported in a housing 2' via output-shaft bearings 12', 14' (FIG. 8) that are held in two bearing holders 10', 11' secured to opposed first and second side walls 2b', respectively, of the housing 2'. The output shaft 5' includes a follower wheel 7' mounted thereon between the output-shaft bearings 12', 14'. The follower wheel 7' is composed of a plurality (three in the illustrated embodiment) of wheel members parallel spaced along the axis of the output shaft 5'. The follower wheel 7' has a plurality of rotatable roller followers 6' disposed on and along an outer periphery thereof. More specifically, the roller followers 6' are composed of two groups of follower rollers, each roller group extending between one pair of adjacent follower wheel members.

The cam shaft 3' of the indexing drive 1' is rotatably supported in the housing 2' via cam bearings 19' that are held in two cam-bearing holders 18' secured to the first and second side walls 2b', respectively, of the housing 2'. The cam shaft 3' is disposed substantially in parallel with the output shaft 5'.

A cam 4' composed of two properly designed disk cam elements attached to a support boss is mounted on the cam shaft 3' between the cam-bearing holders 18',18'. The cam 4' is engageable with respective ones of the roller followers 6' of the follower wheel 7'. The cam 4' further has an axial hole 4a' (FIG. 8) into which the cam shaft 3' is inserted. The cam 4' is fixed to the cam shaft 3' via a fastening collar 21' and via a key (not shown) against rotation relative to the cam shaft 3'.

Figure 9:
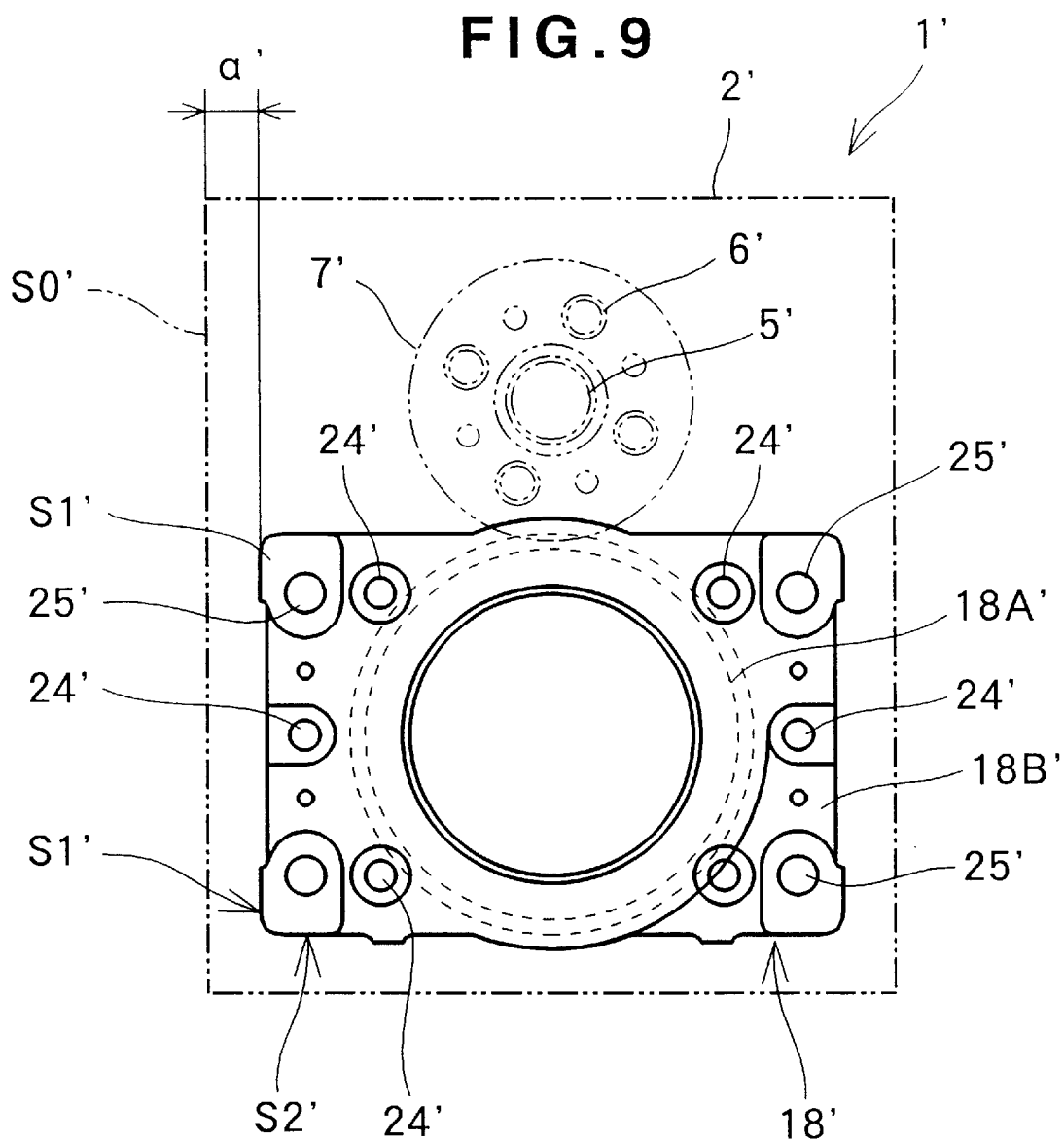
FIG. 9 is a view illustrating details of a positioning flange formed on each of cam-bearing holders of the indexing drive of FIG. 7.

The two cam-bearing holders 18' are bolted to the first and second side walls 2b' of the housing 2' in such a way that a position of the cam shaft 3' relative to the output shaft 5' is adjustable in a direction toward and away from the output shaft 5'. As shown in FIG. 9, each of the cam-bearing holders 18' has a first reference surface S1' and a second reference surface S2' for positioning the cam-bearing holder 18' relative to the housing 2'.

The housing 2' has a positioning reference surface S0' (FIG. 9) lying in a plane parallel to a vertical plane common to the respective axes of the cam shaft 3' and output shaft 5'. The housing 2' further has two coaxial side bearing fitting holes 17' (FIG. 8) of the same circular shape formed in the side walls 2b'. The cam-bearing holders 18' each include a cylindrical portion 18A' received in one of the side bearing fitting holes 17' and a positioning flange 18B' secured to the corresponding side wall 2b' of the housing 2'. The cylindrical portion 18A' of each cam-bearing holder 18' has an outside diameter slightly smaller than the inside diameter of the side bearing fitting holes 17'. The positioning flange 18B' of the cam-bearing holder 18' has a first peripheral surface portion forming the first reference surface S1' and lying in a plane parallel to the positioning reference surface S0' of the housing 2', and a second peripheral surface portion forming the second reference surface S2' and lying in a plane parallel to the axis of the output shaft 5'.

The positioning flange 18B' of each cam-bearing holder 18' has a rectangular shape, as shown in FIG. 9. The first peripheral surface portion (forming the first reference surface S1') extends along one side of the rectangular positioning flange, and the second peripheral portion (forming the second reference surface S2') extends along an adjacent side of the rectangular positioning flange.

The indexing drive 1' of the foregoing construction can be assembled in substantially the same manner as the indexing drive 1 of the first embodiment shown in FIGS. 1–6. A sequence of assembling steps of the indexing drive 1' can therefore be described in brief.

1) First, the cam bearings 19' are placed into the two cam-bearing holders 18', each provided with preload adjustment ring 20' (FIG. 8), so that the cam 4' is supported in the housing 2' via the bearings 19' and secured to the housing 2' by screwing the fastening bolts through the bolt holes 24' (FIG. 9) of the respective positioning flanges 18B' of the cam-bearing holders 18'. In this condition, the preloads to be imparted to the bearings 19' are set by adjusting the positions of the preload adjustment rings 20'.

2) Next, the cam 4' is temporarily removed from within the housing 2', and the bearing 12' is mounted on the output shaft 5' with the roller followers 6' already fixed to the follower wheel 7'. Then, the output-shaft bearing 12' is incorporated into the bearing holder 10', and the output shaft 5', bearing 12' and bearing holder 10' coupled together via the fixing ring 13' are inserted, as a unit, into the housing 2'.

After that, the output-shaft-bearing holder 11' with the bearing 14' incorporated therein is mounted to the housing 2' so that the output shaft 5' is supported via the two bearings 12' and 14'. In this condition, the preload adjustment ring 15' is attached to the output shaft 5' to thereby set preloads on the bearings 12' and 14'.

3) Then, the cam 4' is again inserted into place within the housing 2', and the cam-bearing holders 18' on the opposite sides of the cam 4' are positioned relative to the housing 2'. More specifically, in this step, the two cam-bearing holders 18' are positioned relative to the housing 2', through positional adjustment via a gauge, shims etc., such that the first reference surface S1' of each of the holders 18' is laterally spaced, by a predetermined distance α', from the positioning reference surface S0' (FIG. 9) formed on one side of the housing 2', and then the two cam-bearing holders 18' are provisionally bolted to the housing 2'. The positioning reference surface S0' lies in a plane parallel to a common plane of the axes of the cam shaft 3' and output shaft 5'. Thus, the positioning reference surface S0' and the first reference surface S1' are in parallel with each other.

4) Next, the axial position of the cam 4' relative to the follower rollers 6' is adjusted by turning the preload adjustment rings 20', provided on the opposite sides of the cam 4', by the same angle in such a manner that the already-set preload on the bearing 19' is not varied.

5) After step 4), the fastening bolts, fixing the two cam-bearing holders 18' to the housing 2', are loosened so as to move the cam 4' relative to the output shaft 5', so that the preloads are set to achieve an appropriate engagement between the cam 4' and the roller followers 6' while checking for any undesired play between them.

In this step, the cam 4' is positioned in such a way that the second reference surfaces S2' of the positioning flanges 18B' lie at the same level on the opposite sides of the housing 2', and then the two bearing holders 18' are completely secured to the housing 2' by means of the fastening bolts. This way, the assemblage of the indexing drive 1' is completed.

Figure 10:
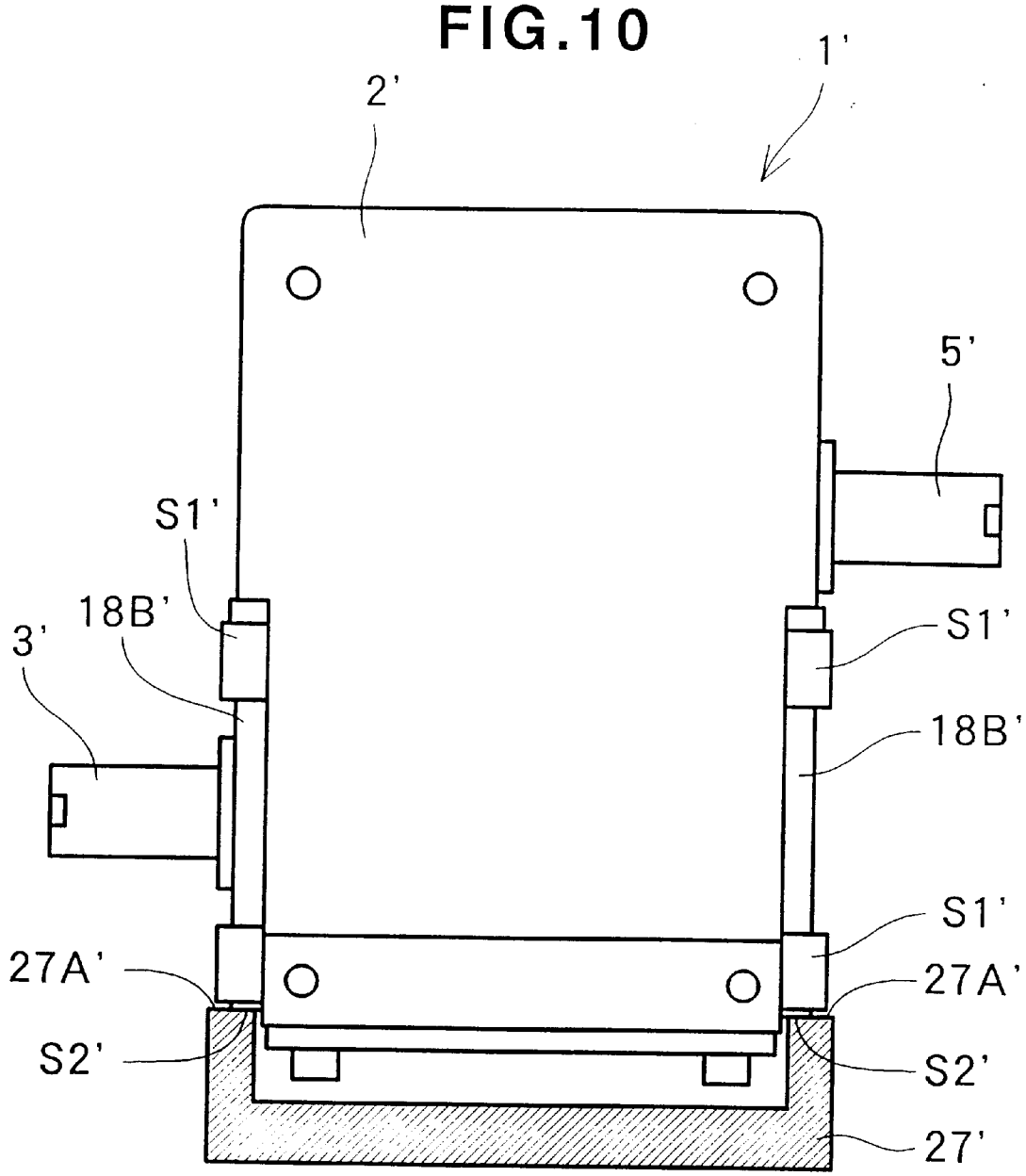
FIG. 10 is a view explanatory of a manner in which a distance between the cam shaft and output shaft of the indexing device of FIG. 7 is adjusted using a positioning jig.
Figure 11:
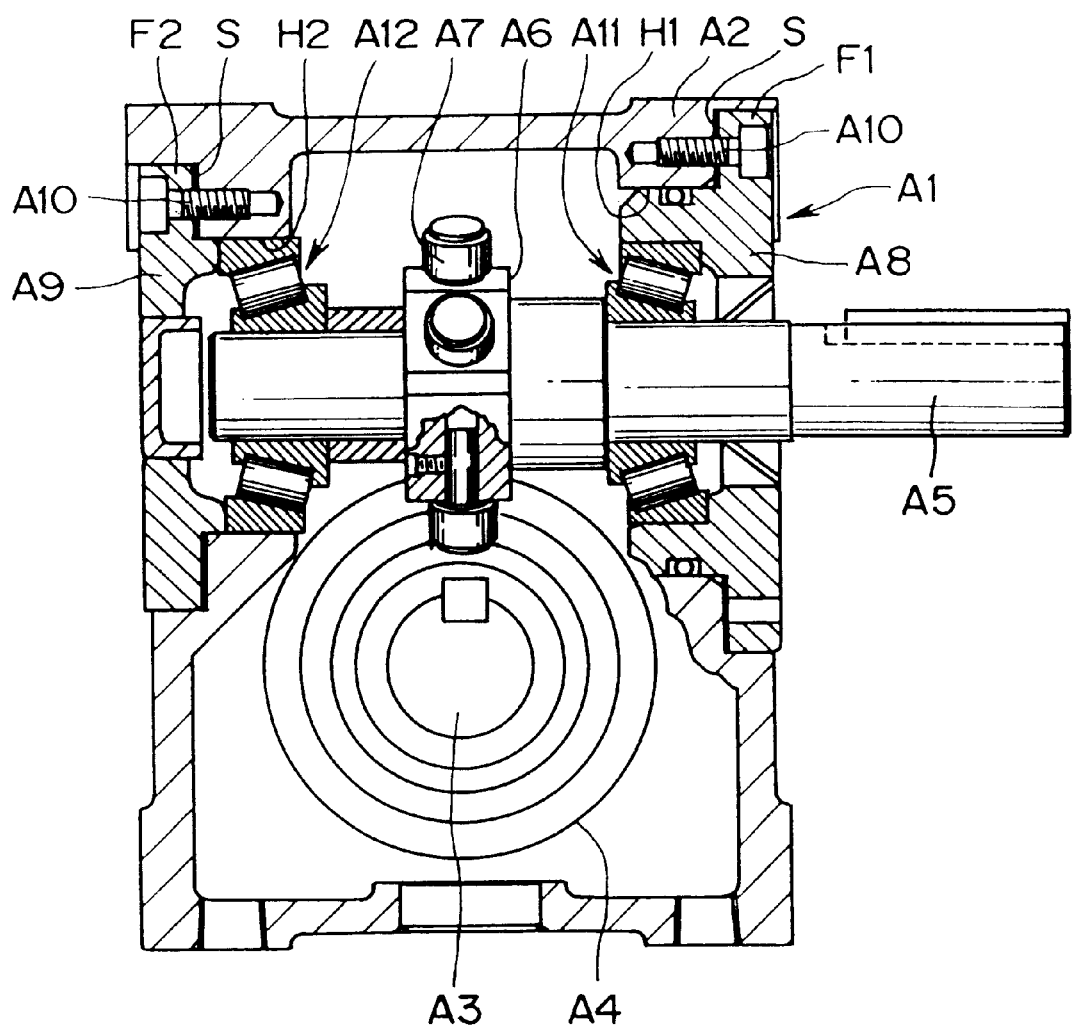
FIG. 11 is a side sectional view of a conventionally-known indexing drive, which shows an exemplary interior construction of the indexing drive.
Figure 12:
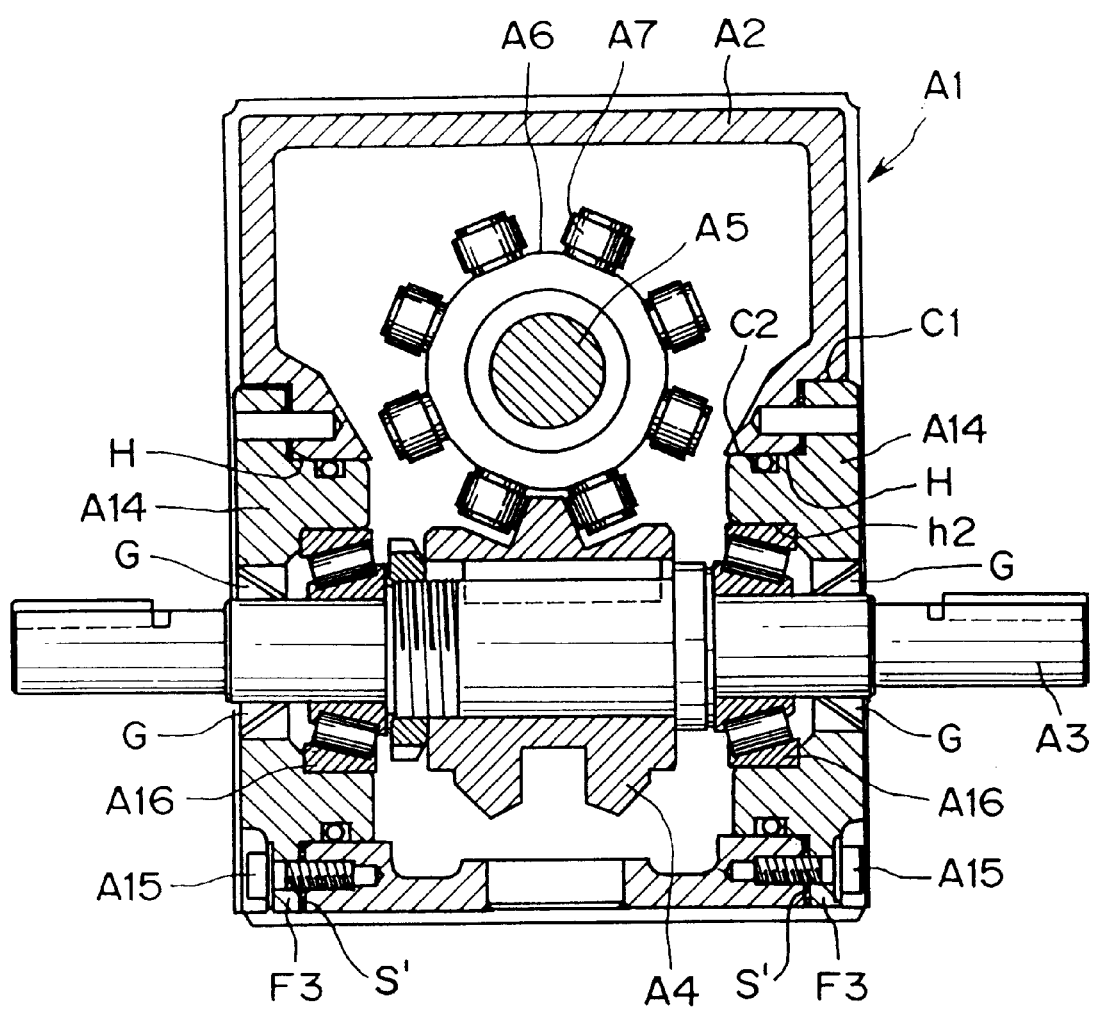
FIG. 12 is a front sectional view of the conventionally-known indexing drive of FIG. 11.
Figure 13:
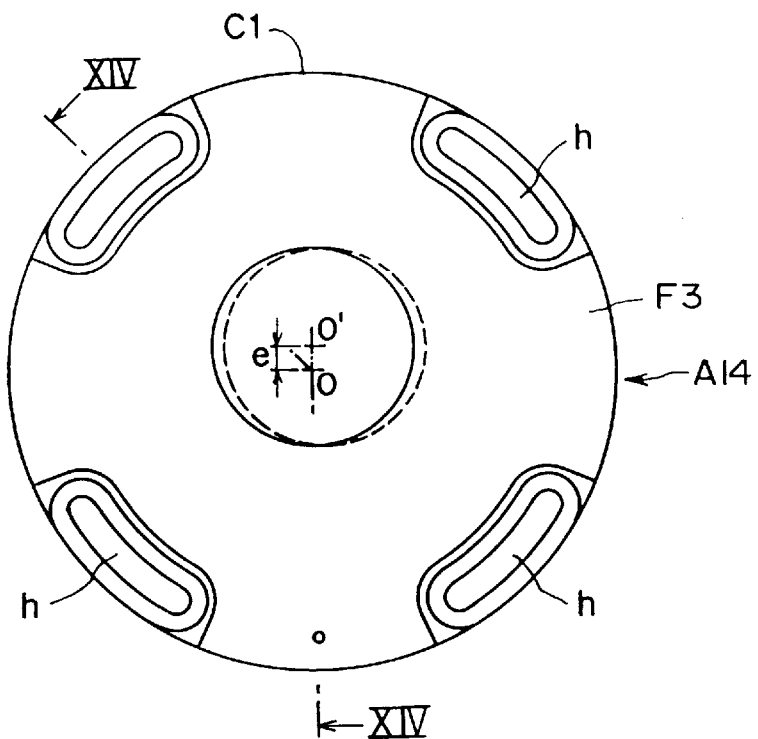
FIG. 13 is a view showing an eccentric bearing holder employed in the conventionally-known indexing drive of FIG. 11.
Figure 14:
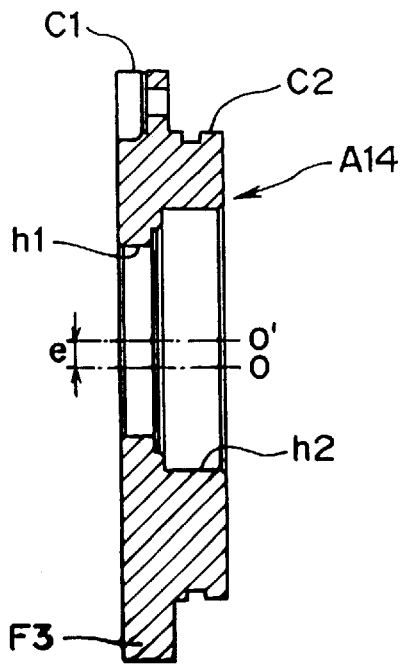
FIG. 14 is a sectional view of the conventionally-known indexing drive taken along the lines XIV—XIV.

In order to allow the second reference surfaces S2' of the flanges 18B' to accurately lie at the same level on the opposite sides of the housing 2', a positioning jig 27' as shown in FIG. 10 may be used. Such positioning by the jig 27' is readily achieved by uniformly pressing a pair of gauging surfaces 27A' of the jig 27' against the respective second reference surfaces S2' of the two bearing holders 18'.

After the output shaft 5' and cam 4' have been installed in the housing 2', the cam shaft 3' is threaded through the axial hole 4A' of the cam 4', and the cam 4' is fixed to the cam shaft 3' via the fastening collar 21' and via the key against rotation relative to the shaft 3'.

It should also be noted that the positioning steps 3) and 4) described above may be omitted in the assemblage of the parallel indexing drive 1'.

In summary, according to one aspect of the present invention, the respective reference surfaces of the two cam-bearing holders are positioned relative to the axial positioning reference of the output shaft by use of a gauge, positioning jig etc. Thus, in the indexing drive where the output shaft and the cam shaft are disposed at right angles to each other, the operations for positioning the cam relative to the roller followers on the output shaft can be performed with increased accuracy and efficiency without relying on a skilled human operator.

According to another aspect of the present invention, the respective reference surfaces of the two cam-bearing holders are pushed, via the adjustment jig or the like, to cause the cam to move toward the output shaft in parallel relation to the output shaft, and adjustment of the preload between the roller follower and the cam can be made while ascertaining a condition of abutting engagement between them. This arrangement eliminates the need for repeating the positioning operations as in the conventionally-known indexing drive where the condition of the abutting engagement between the roller followers and the cam is visually ascertained on the basis of adherence of the coating material applied onto the cam. Therefore, the present invention allows the assembling and position-adjusting operations to be performed with increased efficiency.

Further, the present invention can effectively avoid the problems of the conventionally-known indexing drive where the relative position between the cam shaft and the output shaft is adjusted by turning the bearing holders; that is, the present invention can eliminate any positional misadjustment between the output shaft and the cam shaft due to the eccentricity of the bearing holders during preload adjustment therebetween, as well as any inclination of the cam shaft due to a difference between the rotating amounts of the left and right eccentric bearing holders. Therefore, the present invention can assemble the indexing drive with greatly enhanced accuracy. As a result, the present invention can enhance the accuracy of the meshing engagement between the cam and the roller followers and thus minimize wear of the cam and roller followers due to misengagement therebetween, thereby maintaining a high indexing accuracy over a long period of time.

Obviously, various minor changes and modifications of the present invention are possible in the light of the above teaching. It is therefore to be understood that within the scope of the appended claims the present invention may be practiced otherwise than as specifically described.

What is claimed is:

1. An indexing drive comprising:

a housing having upper and lower parts, said upper part having opposed first and second side walls, and said lower part having opposed third and fourth side walls;

an output shaft rotatably supported in said upper part of the housing via output-shaft bearings that are held in two bearing holders secured to said opposed first and second side walls, respectively, of said housing, said output shaft including a positioning reference surface outside of said housing, said reference surface being perpendicular to the axis of said shaft, and a follower wheel mounted on said shaft between said output-shaft bearings, said follower wheel having a plurality of rotatable roller followers disposed on and along an outer periphery thereof;

a cam shaft rotatably supported in said lower part of the housing via cam bearings that are held in two cam-bearing holders secured to said opposed third and fourth side walls, respectively, of said housing, said third and fourth walls extending substantially at right angles to said first and second side walls in such a way that said cam shaft is disposed substantially at right angles to said output shaft; and a cam mounted on said cam shaft between said cam-bearing holders, said cam shaft being mounted relative to said output shaft so that said cam is engageable with respective ones of said roller followers of said follower wheel, wherein said two cam-bearing holders are bolted to said third and fourth side walls of said housing in such a way that respective positions of said cam-bearing holders are adjustable within a plane perpendicular to an axial direction of said cam shaft along said third and fourth side walls, each of said cam-bearing holders having first peripheral portions defining a first reference surface engageable with co-planar surfaces for positioning said cam-bearing holder relative to said positioning reference surface of said output shaft in an axial direction of said output shaft and second peripheral portions defining a second reference surface engageable with co-planar surfaces for positioning said cam-bearing holder in a direction orthogonal to the axial direction of said output shaft.

2. An indexing drive according to claim 1, wherein said perpendicular positioning reference surface of said output shaft is formed on a portion of said output shaft projecting from said housing, said housing has two coaxial side bearing fitting holes of the same circular shape formed in said third and fourth side walls, and said cam-bearing holders each include a cylindrical portion received in one of said side bearing fitting holes and a positioning flange secured to said third side wall or said fourth side wall of said housing, said cylindrical portion of each said cam-bearing holder having an outside diameter slightly smaller than the inside diameter of said side bearing fitting holes sufficient to afford displacement of said holder in two orthogonal directions perpendicular to the axis of said cam shaft, and said positioning flange of each said cam-bearing holder having said first peripheral surface portions lying in a plane parallel to said positioning reference surface of said output shaft, and said second peripheral surface portions lying in a plane parallel to the axis of said output shaft.

3. An indexing drive according to claim 2, wherein said positioning flange of each said cam-bearing holder has a rectangular shape, said first peripheral surface portion extending along one side of said rectangular positioning flange, and said second peripheral portion extending along an adjacent side of said rectangular positioning flange.

4. An indexing drive comprising:

a housing having upper and lower parts, said housing lower part having first and second planar surfaces, the plane of the first surface being perpendicular to the plane of the second surface;

an output shaft rotatably supported in said upper part of said housing via output-shaft bearings that are held in two bearing holders secured to opposed side walls, respectively, of said housing, said output shaft including a follower wheel mounted thereon between said output-shaft bearings, said follower wheel having a plurality of rotatable roller followers disposed on and along an outer periphery thereof;

a cam shaft rotatably supported in said lower part of said housing via cam bearings that are held in two cam-bearing holders secured to opposite side walls, respectively, of said housing; and a cam mounted on said cam shaft between said cam-bearing holders, said cam shaft being mounted relative to said output shaft so that said cam is engageable with respective ones of said roller followers of said follower wheel, wherein said two cam-bearing holders are bolted to said opposite side walls of said housing in such a way that respective positions of said cam-bearing holders are adjustable within a plane perpendicular to an axial direction of said cam shaft along said opposite side walls, each of said cam-bearing holders having first peripheral portions defining a first reference surface engageable with said first planar surfaces for displacing said cam-bearing holder toward and away from said output shaft, and second peripheral portions defining a second reference surface engageable with said second planar surfaces for displacing said cam-bearing holder along the axis of said output shaft orthogonal to the direction of displacement of said cam-bearing holder afforded by said first reference surface, said cam shaft having an axis parallel to both of said first and second reference surfaces.

5. An indexing drive according to claim 4 in which said output shaft has a positioning reference surface perpendicular to the axis of said output shaft; wherein said opposite side walls have two coaxial bearing fitting holes of the same or similar shape with a given inside dimension, and said bearing holders each has an outside dimension slightly smaller than the said given inside dimension sufficient to afford displacement of said holder in two orthogonal directions perpendicular to the axis of said cam shaft, each said cam-bearing holder having said first peripheral surface portion lying in a plane parallel to said positioning reference surface of said output shaft, and said second peripheral surface portion lying in a plane parallel to the axis of said output shaft.

* * * * *

UNITED STATES PATENT AND TRADEMARK OFFICE
CERTIFICATE OF CORRECTION

PATENT NO. : 6,324,943 B1
DATED : December 4, 2001
INVENTOR(S) : Sahara

It is certified that error appears in the above-identified patent and that said Letters Patent is hereby corrected as shown below:

<u>Title page,</u>
Item [30], Foreign Application Priority Data, correct the priority information to read;
-- Sept. 4, 1998 (JP)................10-250975 --.

Signed and Sealed this

Twenty-sixth Day of November, 2002

Attest:

Attesting Officer

JAMES E. ROGAN
*Director of the United States Patent and Trademark Office*